(No Model.) 2 Sheets—Sheet 1.
H. H. BLAKE.
DRIVING GEAR FOR ROAD ENGINES.
No. 535,937. Patented Mar. 19, 1895.
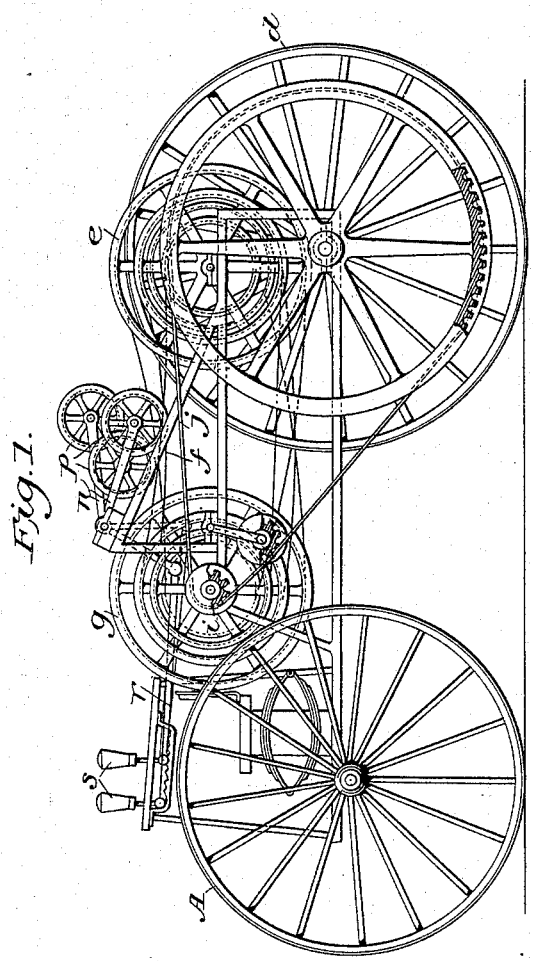
Witnesses.
W. H. Edwards.
Wm. V. Moon.
Inventor.
Henry H. Blake,
John H. Roney
Attorney

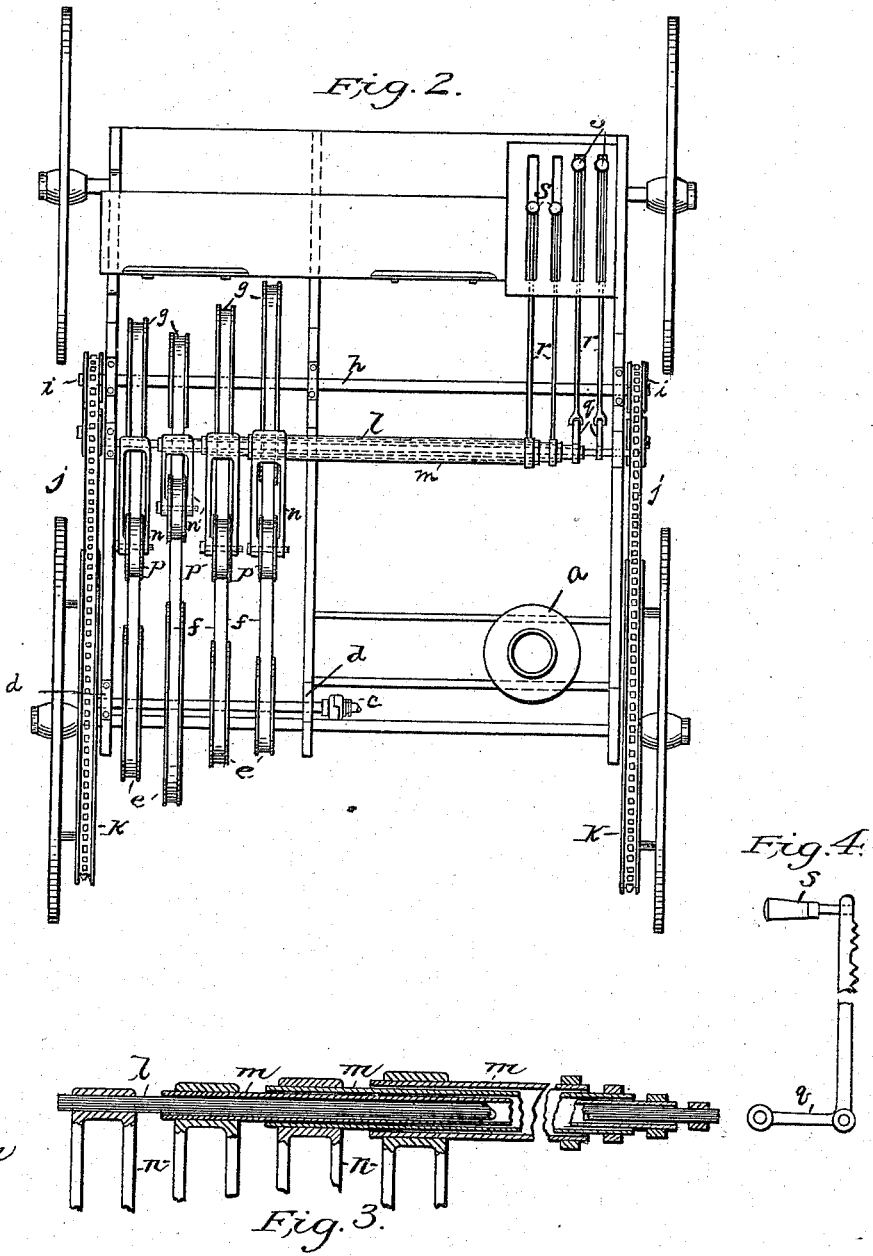

UNITED STATES PATENT OFFICE.

HENRY H. BLAKE, OF PITTSBURG, PENNSYLVANIA.

DRIVING-GEAR FOR ROAD-ENGINES.

SPECIFICATION forming part of Letters Patent No. 535,937, dated March 19, 1895.

Application filed December 5, 1893. Serial No. 492,874. (No model.)

*To all whom it may concern:*

Be it known that I, HENRY H. BLAKE, a citizen of the United States, residing at Pittsburg, in the county of Allegheny and State of Pennsylvania, have invented certain new and useful Improvements in Driving-Gearing; and I do hereby declare the following to be a full, clear, and exact description of the invention, such as will enable others skilled in the art to which it pertains to make and use the same, reference being had to the accompanying drawings, which form a part of this specification, in which—

Figure 1 indicates a side elevation of my improved road vehicle. Fig. 2 is a plan of same. Fig. 3 is a longitudinal sectional view of belt tighteners. Fig. 4 is an enlarged detail of handle and shaft levers. Fig. 5 is an enlarged detail of tightener arms.

My invention relates to road vehicles adapted to be driven by steam or electrical motors, and consists of the novel construction and arrangement of parts hereinafter specified, reference being had to the accompanying drawings forming part hereof, in which like letters indicate like parts wherever they occur.

Referring to said drawings A is an ordinary four wheeled vehicle, on which are mounted a boiler $a$ and an engine or electric motor $b$. Said motor is coupled in any suitable manner with the transverse shaft $c$ journaled in brackets $d$—$d$ secured to the frame of said carriage toward the rear thereof. Secured upon said shaft are four belt pulleys $e$—$e$—$e$—$e$ of different diameters upon which belts $f$ are loosely mounted whereby said pulleys may be geared with and transmit power to a series of belt pulleys $g$—$g$ secured upon the transverse shaft $h$ journaled in any suitable manner in the sides of said carriage frame, a large pulley on one of said shafts being geared to one of less diameter upon the opposite shaft whereby varying speed may be obtained. Secured upon said shaft $h$ at the extreme ends thereof are the small grooved sprocket wheels $i$—$i$ on which the sprocket chains $j$ operate to transmit power to the large sprocket wheels $k$ mounted on the rear wheels of the carriage, for the purpose of driving the same. Between and above the plane of said shafts, is secured a transverse shaft $l$ on which is rigidly secured a series of sleeves or hollow shafts $m$—$m$, the ends respectively of which have a pair of arms $n$—$n$ which overhang said belts, and carry tightening pulleys $p$—$p$ and levers $q$—$q$ the ends of said levers having secured thereto the connecting rods $r$—$r$ leading toward the front of the vehicle, and terminating in handles $s$—$s$ whereby the occupant by operating the proper handle, is enabled to drop either of said tighteners upon either belt desirable, said transverse shaft $l$ also carrying a pair of arms $n$ having belt tighteners, whereby by oscillating said shaft in the arc of a circle, either belt may be tightened upon the pulley geared therewith and by reversing said handle, said pulley tightener may be thrown above the belt, thereby releasing the same. Suitable locking devices may be employed in connection with said handles, to maintain said tighteners in contact with their respective belts, or out of contact therewith when raised from the same.

I do not restrict my invention to vehicles, as my method of gearing may be employed to transmit power irrespective of the devices to be driven thereby.

Having described my invention, what I claim, and desire to secure by Letters Patent, is—

In a vehicle, the combination of a carriage having secured thereon a motor, two parallel shafts one of which is coupled in any suitable manner with said motor, the other being geared with the rear axle of the vehicle, a transverse shaft between and above the plane of said before mentioned shafts, on which are rigidly secured a number of sleeves of varying lengths, a series of belt tighteners carried by a series of arms, secured to said transverse shaft, and the sleeves rigidly secured thereon, a series of belt pulleys of varying diameter carrying loose belts, pulleys of larger diameter on either shaft being geared with a pulley of smaller diameter than on the opposite shaft, and levers adapted to raise and lower said belt tighteners, substantially as described.

In testimony that I claim the foregoing I hereunto affix my signature this 4th day of December, A. D. 1893.

HENRY H. BLAKE. [L. S.]

In presence of—
 JAS. J. MCAFEE,
 C. A. WILLIAMS.